(12) United States Patent
Bodtker et al.

(10) Patent No.: US 10,099,715 B2
(45) Date of Patent: Oct. 16, 2018

(54) STATIONARY ENERGY ABSORPTION STRAP CONTROL ASSEMBLY FOR VEHICLE STEERING COLUMN

(71) Applicant: STEERING SOLUTIONS IP HOLDING CORPORATION, Saginaw, MI (US)

(72) Inventors: Joen C. Bodtker, Gaines, MI (US); Randy W. Jones, North Branch, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 54 days.

(21) Appl. No.: 15/293,848

(22) Filed: Oct. 14, 2016

(65) Prior Publication Data

US 2018/0105196 A1    Apr. 19, 2018

(51) Int. Cl.
*B62D 1/19*    (2006.01)

(52) U.S. Cl.
CPC .............. *B62D 1/195* (2013.01); *B62D 1/19* (2013.01); *B62D 1/192* (2013.01)

(58) Field of Classification Search
CPC .......... B62D 1/19; B62D 1/192; B62D 1/195
See application file for complete search history.

(56) References Cited

U.S. PATENT DOCUMENTS

| | | | | |
|---|---|---|---|---|
| 7,735,868 B2* | 6/2010 | Ridgway | ................ | B62D 1/184 280/775 |
| 7,819,426 B2* | 10/2010 | Streng | .................... | B62D 1/184 280/775 |
| 8,047,096 B2* | 11/2011 | Ridgway | ................ | B62D 1/184 280/775 |
| 8,375,822 B2* | 2/2013 | Ridgway | ................ | B62D 1/184 280/775 |
| 8,403,364 B2* | 3/2013 | Monteil | ................. | B62D 1/195 280/775 |
| 8,438,944 B2* | 5/2013 | Ridgway | ................ | B62D 1/195 280/775 |
| 8,500,168 B2* | 8/2013 | Goulay | .................. | B62D 1/195 280/777 |
| 8,689,659 B2* | 4/2014 | Schnitzer | ............... | B62D 1/195 280/777 |

(Continued)

FOREIGN PATENT DOCUMENTS

JP        2016097782 A  *  5/2016

*Primary Examiner* — Laura Freedman
(74) *Attorney, Agent, or Firm* — Cantor Colburn LLP

(57) ABSTRACT

A steering column assembly includes an upper jacket. Also included is a lower jacket, the upper jacket translatable relative to the lower jacket. Further included is an energy absorption strap operatively coupled to the upper jacket and the lower jacket, the strap translatable with the upper jacket. Yet further included is an engagement mechanism operatively coupled to the lower jacket, the engagement mechanism moveable between an engaged condition with the energy absorption strap and a disengaged condition with the energy absorption strap, the engaged condition increasing the energy absorption load of the steering column assembly during collapse of the upper jacket into the lower jacket, the engagement mechanism remaining in a stationary position relative to the lower jacket during translation of the energy absorption strap.

18 Claims, 12 Drawing Sheets

(56) References Cited

U.S. PATENT DOCUMENTS

| | | | | |
|---|---|---|---|---|
| 8,783,717 B2* | 7/2014 | Tinnin | | B62D 1/195 |
| | | | | 280/777 |
| 8,827,311 B2* | 9/2014 | Schnitzer | | B62D 1/184 |
| | | | | 188/371 |
| 8,936,274 B2* | 1/2015 | Burns | | B62D 1/184 |
| | | | | 280/775 |
| 8,978,510 B2* | 3/2015 | Buzzard | | B62D 1/184 |
| | | | | 280/775 |
| 9,056,628 B2* | 6/2015 | Russell | | B62D 1/195 |
| 9,233,707 B2* | 1/2016 | Domig | | B62D 1/195 |
| 9,242,667 B2* | 1/2016 | Yoshihara | | B62D 1/184 |
| 9,302,696 B2* | 4/2016 | Buzzard | | F16F 7/128 |
| 9,409,591 B2* | 8/2016 | Johta | | B62D 1/184 |
| 9,428,211 B2* | 8/2016 | Vermeersch | | B62D 1/19 |
| 9,428,215 B1* | 8/2016 | Nagatani | | B62D 1/184 |
| 9,545,943 B2* | 1/2017 | Sakuda | | B62D 1/185 |
| 9,616,915 B2* | 4/2017 | Sakuda | | B62D 1/184 |
| 9,623,897 B2* | 4/2017 | Myohoji | | B62D 1/195 |
| 9,663,134 B2* | 5/2017 | Imagaki | | B62D 1/185 |
| 9,669,862 B1* | 6/2017 | Dubay | | B62D 1/192 |
| 9,828,019 B2* | 11/2017 | Dubay | | B62D 1/195 |
| 9,834,246 B1* | 12/2017 | Woycik | | F16F 7/12 |
| 9,849,906 B2* | 12/2017 | Uesaka | | B62D 1/195 |
| 9,868,458 B1* | 1/2018 | Ravindra | | B62D 1/195 |
| 2015/0239490 A1* | 8/2015 | Sakata | | B62D 1/195 |
| | | | | 74/493 |
| 2016/0075367 A1* | 3/2016 | Sakuda | | B62D 1/195 |
| | | | | 74/493 |
| 2016/0288821 A1* | 10/2016 | Sakuda | | B62D 1/185 |
| 2017/0320513 A1* | 11/2017 | Dubay | | B62D 1/195 |
| 2017/0349203 A1* | 12/2017 | Anspaugh | | B62D 1/184 |
| 2018/0111640 A1* | 4/2018 | Bodtker | | B62D 1/184 |
| 2018/0141582 A1* | 5/2018 | Bodtker | | B62D 1/195 |

* cited by examiner

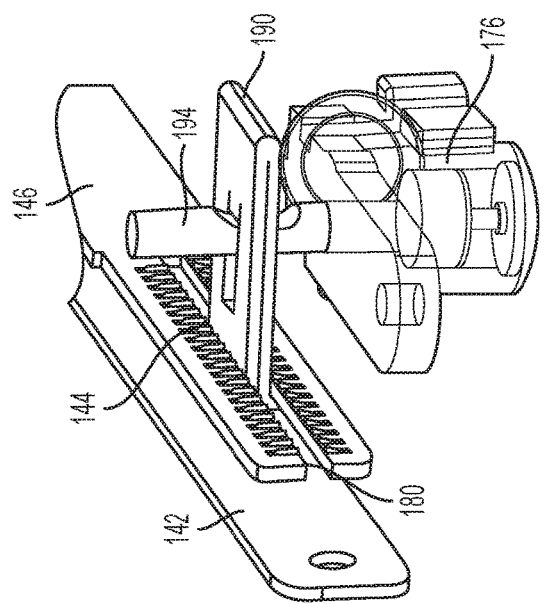
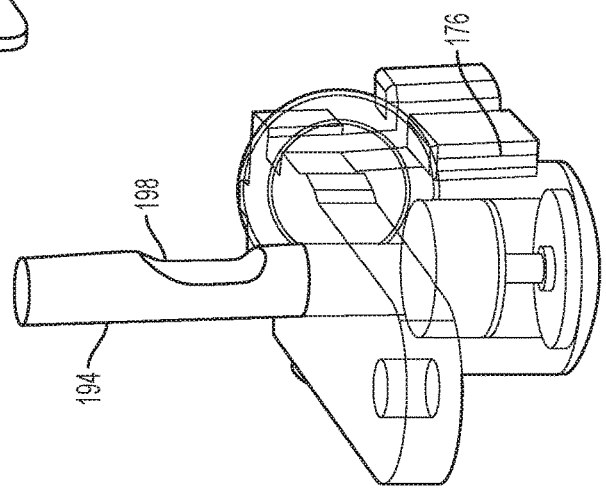
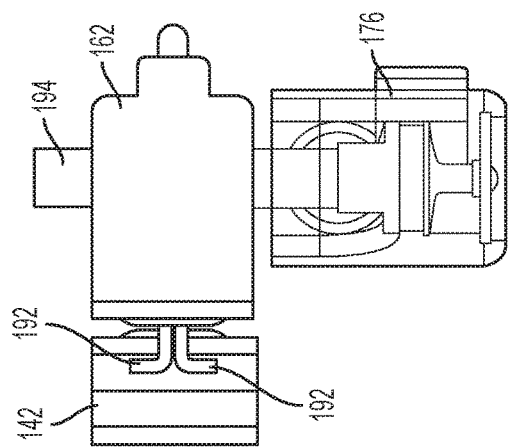

US 10,099,715 B2

STATIONARY ENERGY ABSORPTION STRAP CONTROL ASSEMBLY FOR VEHICLE STEERING COLUMN

BACKGROUND

The embodiments described herein relate generally to steering columns and, more particularly, to a stationary energy absorption strap control assembly for steering columns.

On adjustable steering columns, it is sometimes desirable to provide a selectable collapse load to tune energy absorption according to an occupant's mass. Typical systems employ two energy absorbing straps that work in tandem. The straps are connected to each other by a pin. When it is desired to have a lower energy absorption level, the pin is retracted from between the two straps by an actuator so that only one strap is in operation during a collapse event. Because the strap is also part of an ergonomic adjustment system, it must translate while the operator telescopes the column to a desired position.

Due to the connected nature of the two energy absorption straps, the actuator is also connected to them by necessity. Consequently, the actuator must shuttle back and forth with the strap and an upper jacket of the column when the column is adjusted. This requires the actuator to have a fatigue resistant, and sufficiently strain relieved, wiring harness to assure electrical connectivity at all times. Furthermore, due to the size of the actuator, it must be mounted on the exterior of the jacket assembly. This requires a large access slot in the stationary (e.g., lower) jacket in order to connect the straps to the upper jacket and a mounting bracket (e.g., rake bracket) simultaneously. The large slot structurally weakens the lower jacket and the jacket must be made heavier to compensate for the loss of strength.

SUMMARY OF INVENTION

In accordance with an embodiment of the invention, a stationary energy absorption strap control assembly includes an energy absorption strap operatively coupled to an upper jacket of a steering column assembly and to a lower jacket of the steering column assembly, the energy absorption strap having a plurality of teeth arranged along a first surface of the energy absorption strap. Also included is an engagement bracket operatively coupled to the lower jacket and partially disposed within a window defined by the lower jacket, the engagement bracket having a backing plate disposed between the lower jacket and a second surface of the energy absorption strap, the engagement bracket remaining in a stationary position relative to the lower jacket during translation of the energy absorption strap. Further included is an engagement member coupled to the engagement bracket and having a plurality of locking teeth, the engagement member moveable between an engaged condition and a disengaged condition, the engaged condition disposing the plurality of locking teeth of the engagement member and the plurality of teeth of the energy absorption strap into engagement.

According to another embodiment of the invention, a steering column assembly includes an upper jacket. Also included is a lower jacket, the upper jacket translatable relative to the lower jacket. Further included is an energy absorption strap operatively coupled to the upper jacket and the lower jacket, the strap translatable with the upper jacket. Yet further included is an engagement mechanism operatively coupled to the lower jacket, the engagement mechanism moveable between an engaged condition with the energy absorption strap and a disengaged condition with the energy absorption strap, the engaged condition increasing the energy absorption load of the steering column assembly during collapse of the upper jacket into the lower jacket, the engagement mechanism remaining in a stationary position relative to the lower jacket during translation of the energy absorption strap.

According to yet another embodiment of the invention, a stationary energy absorption strap control assembly includes an energy absorption strap operatively coupled to an upper jacket of a steering column assembly and to a lower jacket of the steering column assembly, the energy absorption strap translatable with the upper jacket and having a plurality of teeth arranged along a surface of the energy absorption strap. Also included is an engagement bracket operatively coupled to the lower jacket to remain in a stationary position relative to the lower jacket during translation of the energy absorption strap. Further included is a locking component operatively coupled to the engagement bracket and having a plurality of locking teeth, the locking component moveable between an engaged condition and a disengaged condition, the engaged condition disposing the plurality of locking teeth of the locking component and the plurality of teeth of the energy absorption strap into engagement. Yet further included is an actuator rod operatively coupled to the engagement bracket and engageable with the locking component to move the locking component between the engaged condition and the disengaged condition.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 11 is an elevational view of the energy absorption strap control assembly of FIG. 6;

FIG. 12 is a perspective view of the energy absorption strap control assembly of FIG. 6;

FIG. 13 is a perspective view of an actuator mechanism of the energy absorption strap control assembly of FIG. 6;

DETAILED DESCRIPTION

Figure 1:
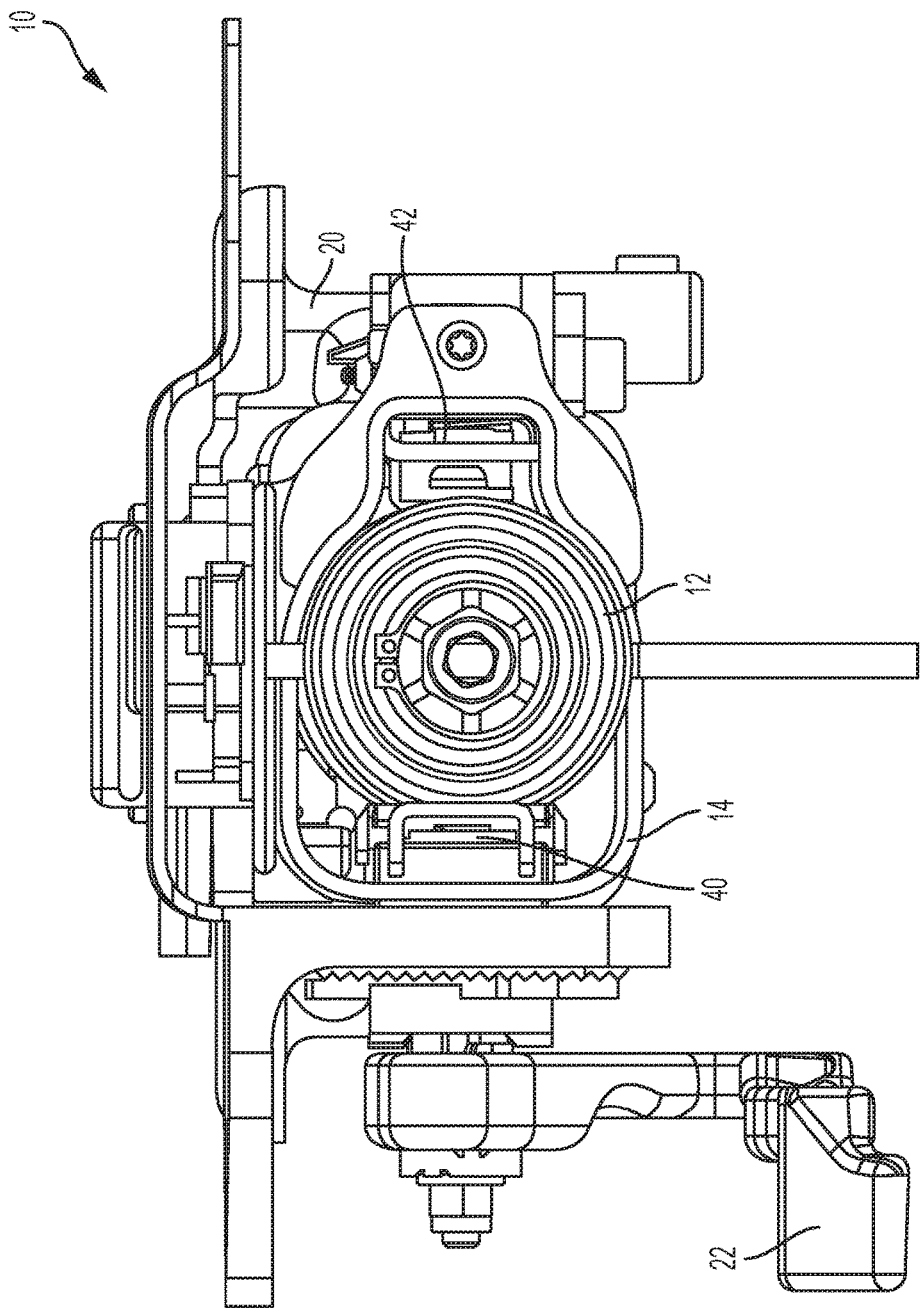
FIG. 1 is an end view of a steering column assembly having an energy absorption strap control assembly according to an aspect of the invention.
Figure 2:
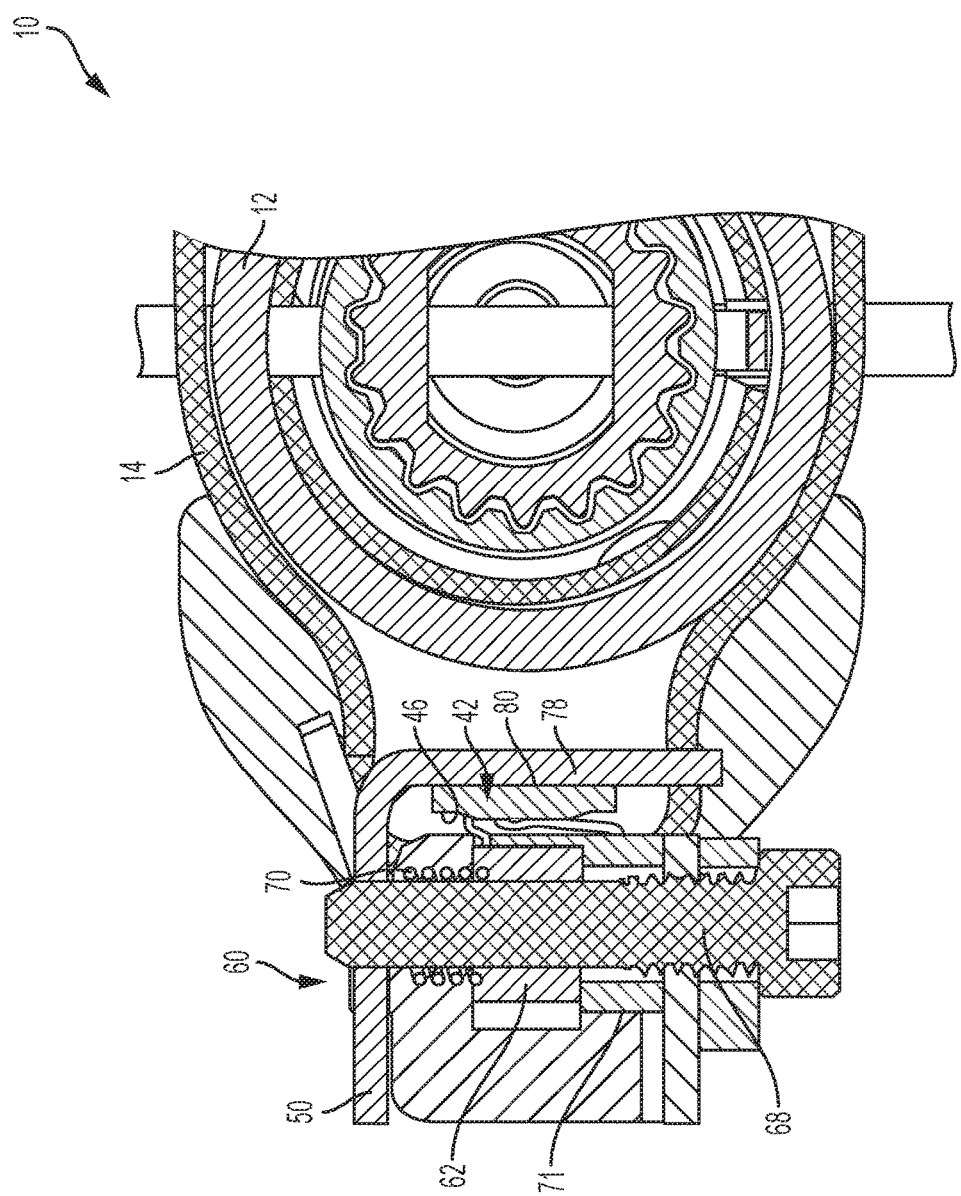
FIG. 2 is an opposite end view of a portion of the steering column assembly illustrating the energy absorption strap control assembly of FIG. 1.
Figure 3:
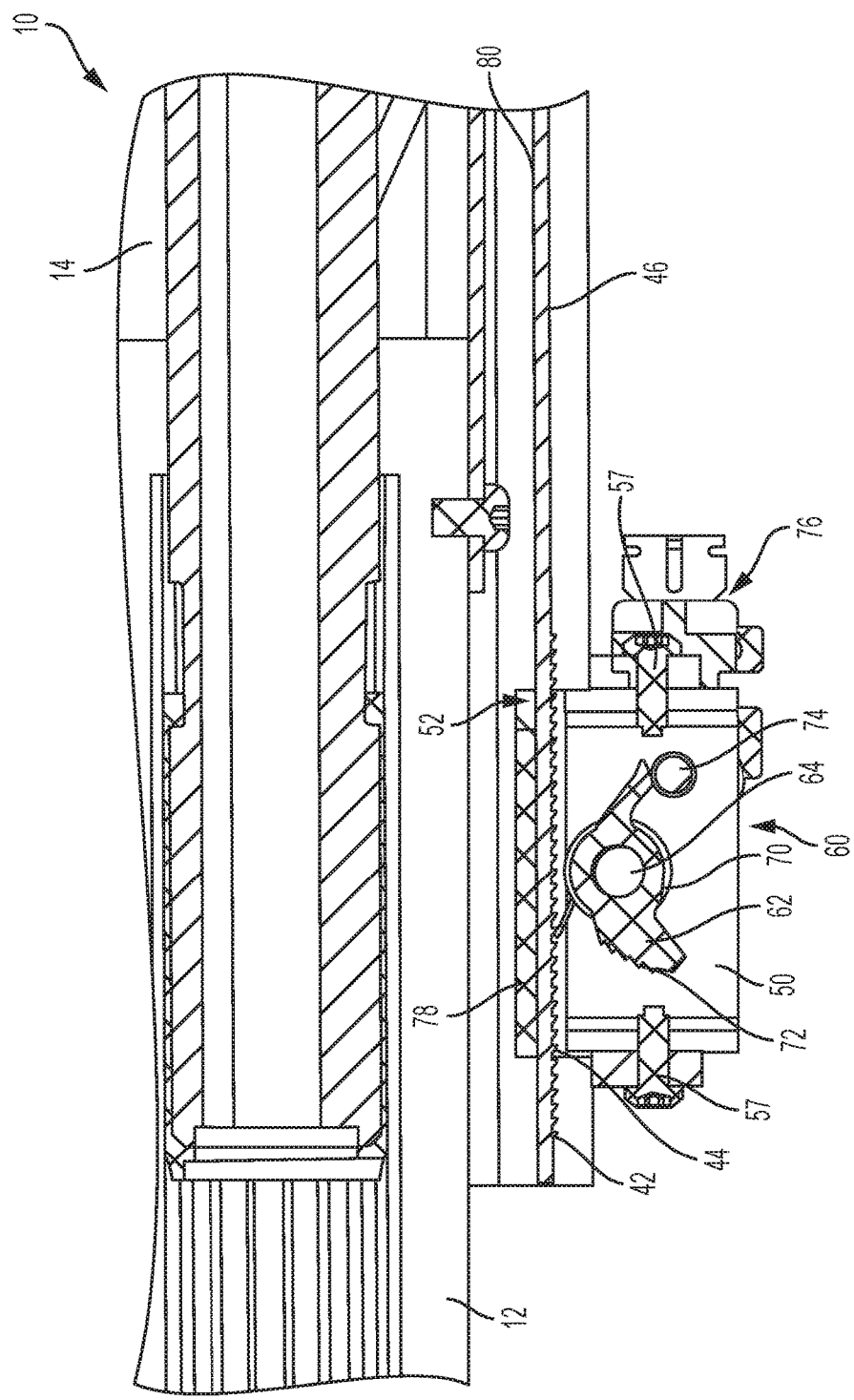
FIG. 3 is a top plan section view of the energy absorption strap control assembly of FIG. 1.
Figure 4:
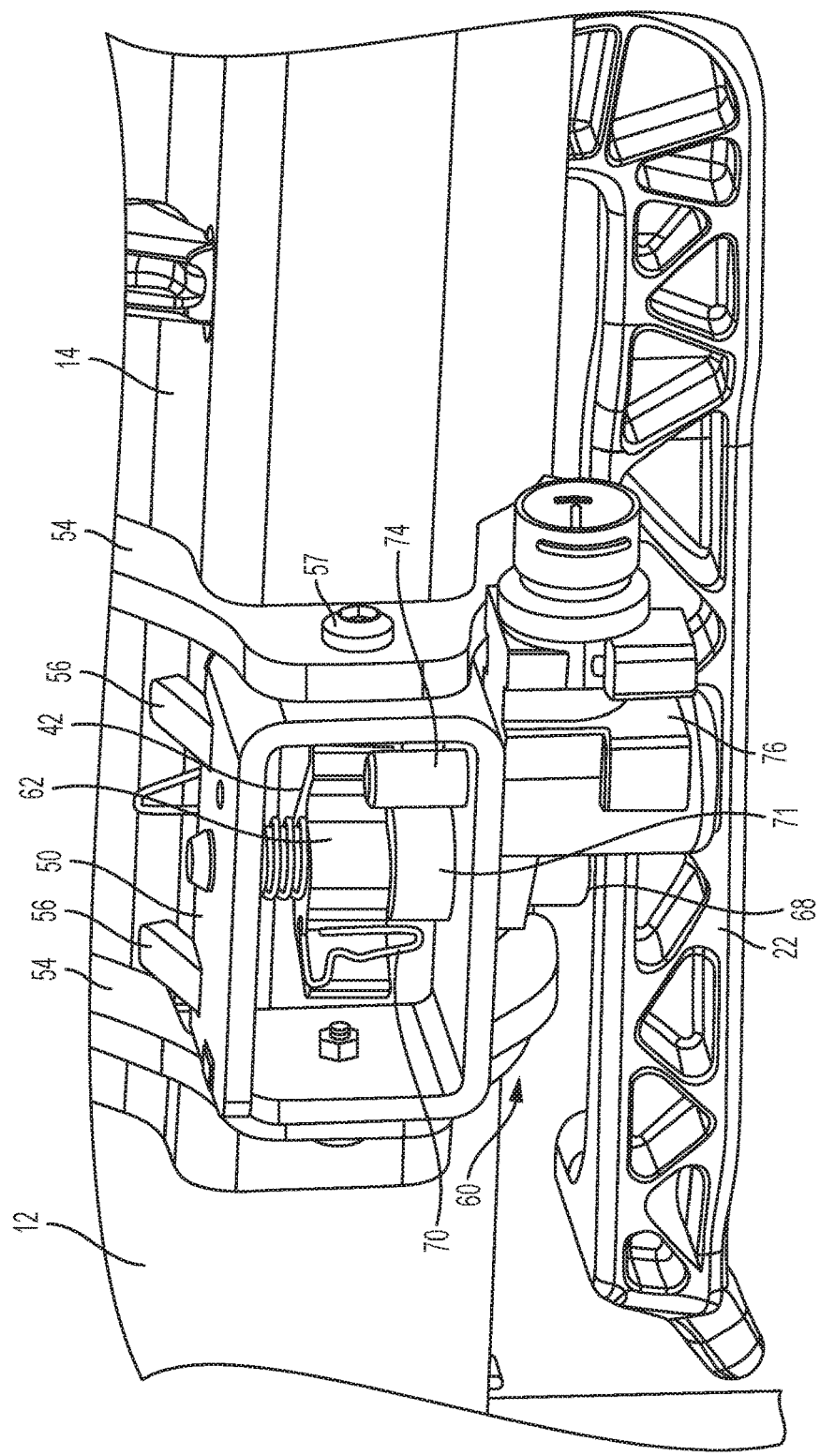
FIG. 4 is a perspective view of the energy absorption strap control assembly of FIG. 1.
Figure 5:
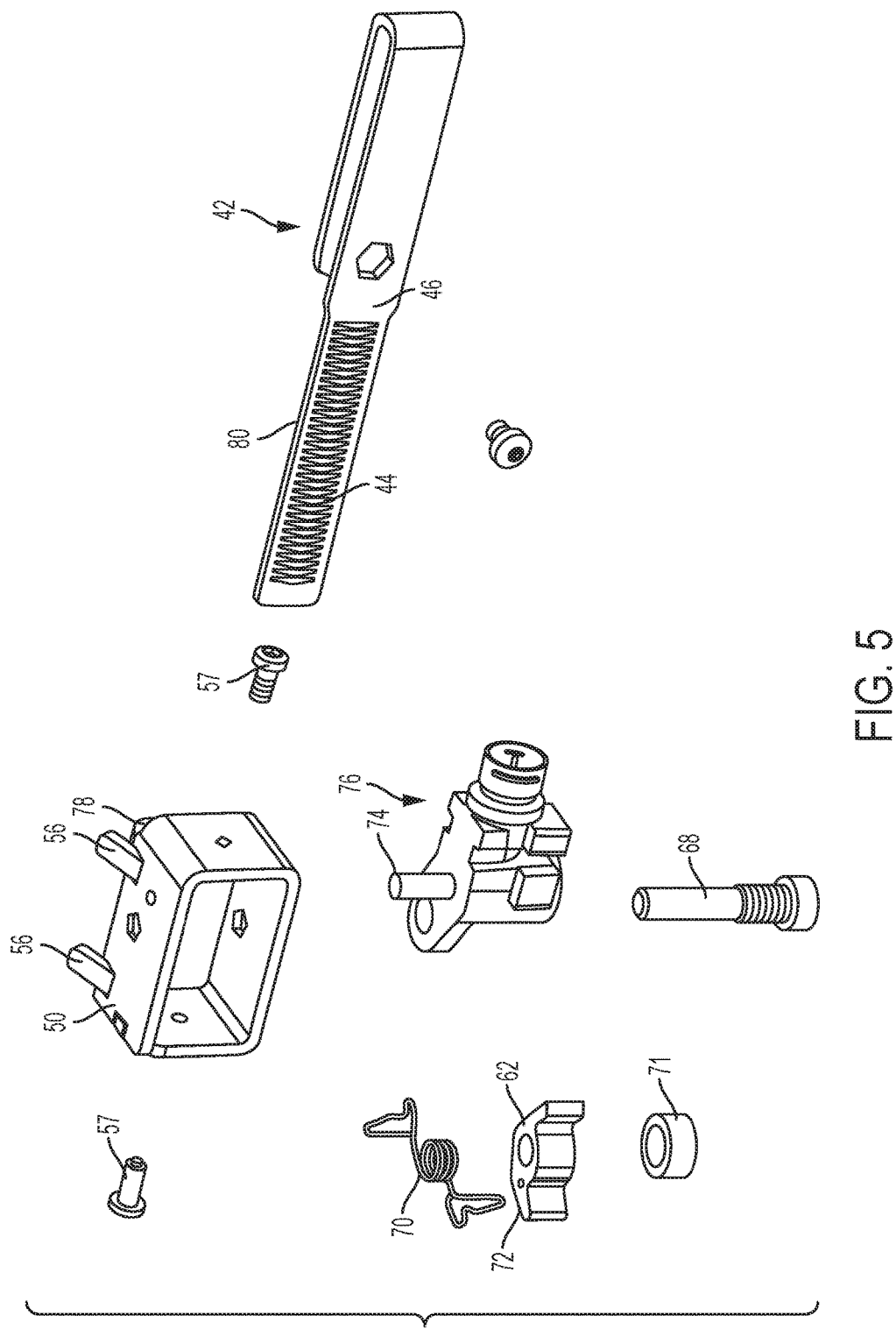
FIG. 5 is a disassembled view of the energy absorption strap control assembly of FIG. 1.

Referring now to the Figures, where the invention will be described with reference to specific embodiments, without limiting same, illustrated is a stationary energy absorption (EA) strap control assembly for a vehicle steering column. As described herein, the EA strap control assembly is implemented in two-stage EA strap systems. Such systems include two EA straps with both in an "active" condition, which is referred to as an engaged condition herein, with one of the EA straps capable of disengaging to modify the energy absorption load capabilities. In the embodiments described herein, one of the EA straps is in an "inactive" condition, or disengaged condition, by default, with the disengaged EA strap engaged in situations where a higher energy absorption capability is desired. The mechanism that controls the condition (i.e., engaged vs. disengaged) of the EA strap is mounted in a stationary position relative to steering column to avoid the need for the mechanism to shuttle with translatable portions of the steering column during adjustment, as described herein.

Referring now to FIGS. 1-4, a portion of a steering column is illustrated and generally referenced with numeral 10. The steering column 10 includes several components, including an upper jacket 12 and a lower jacket 14 that are telescopingly engaged with each other in an axial direction (i.e., longitudinal direction of steering column).

The steering column 10 may be used in any type of vehicle that requires steering operation. A mounting bracket 20 is operatively coupled to the steering column to allow adjustment or relative motion of components of the steering column 10. Adjustment is facilitated by manipulation of an adjustment lever 22 that is operatively coupled to the lower jacket 14. Actuation of the adjustment lever 22 allows a user to switch the steering column between a locked condition and an unlocked condition. In the unlocked condition, a user is able to telescopingly adjust the upper jacket 12 relative to the lower jacket 14 to suit the user's preference. In the locked condition, relative movement of components of the steering column 10 is inhibited.

The steering column 10 includes a first energy absorption strap 40 (first EA strap 40) and a second energy absorption strap 42 (second EA strap 42) that are each operatively coupled to the upper and lower jackets 12, 14. The EA straps 40, 42 each absorb energy during a collapse event of the steering column 10. Respective mechanisms engage the EA straps 40, 42 to maintain the straps in an active condition that absorbs energy during a collapse event. However, when a lower energy absorption load is required, only one of the EA straps is required to be engaged. Rather than maintaining both EA straps in an engaged condition as a default condition, the embodiments described herein keep one of the EA straps in a disengaged condition in a default condition. The EA straps 40, 42 may be positioned at any location around the steering column, such as on sides of the column, as well as on an upper or lower portion of the column.

Referring to FIGS. 2-5, the EA strap control assembly is illustrated in greater detail. An engagement bracket 50 is operatively coupled to the lower jacket 14 and partially disposed within a window 52 (FIG. 3) defined by the lower jacket 14. Coupling of the engagement bracket 50 to the lower jacket 14 is made in any suitable manner. In the illustrated embodiment, a pair of flanges 54 that is integrally formed with the lower jacket 14 provide a coupling location for mechanical fasteners 57 to fix the engagement bracket 50 to the lower jacket 14 in a stationary manner. At least one locating feature 56, such as tabs, extend from the engagement bracket 50 to position the engagement bracket 50 relative to the lower jacket 14 in a desired location.

The EA strap 42 has a plurality of teeth 44 extending along a first surface 46 of the EA strap. An engagement mechanism 60 controls whether the EA strap 42 is in the engaged condition or the disengaged condition. The engaged condition refers to a condition of the overall assembly that activates the EA strap 42 to have both EA straps 40, 42 in the active condition for energy absorption. The disengaged condition refers to a condition of the overall assembly that maintains the EA strap 42 in an inactive condition, thereby only keeping the first EA strap 40 in the active condition.

The engagement mechanism 60 includes an engagement member, such as the illustrated cam 62. The cam 62 defines a through hole 64 that receives a pivot pin 68 therein. The cam 62 is rotatable about the pivot pin 68 and couples the cam 62 to the engagement bracket 50, the pivot pin 68 being fixed relative to the engagement bracket 50. Also surrounding the pivot pin 68 is an engagement spring 70 that includes a portion in contact with the cam 62. A spacer 71 is provided in some embodiments and is positioned around the pivot pin 68 to support the cam 62, as the spacer 71 is positioned between the cam 62 and a wall of the engagement bracket 50.

The cam 62 includes a plurality of locking teeth 72 that are positioned to be engaged in a meshed condition with the teeth 44 of the EA strap 42 in the engaged condition and disengaged therefrom in the disengaged condition. The engagement spring 70 biases the cam 62 toward the engaged condition, but a release pin 74 prevents rotation of the cam 62 in a default condition to maintain the disengaged condition of the assembly. The release pin 74 is part of an actuator mechanism 76 and extends therefrom. The release pin 74 extends a length sufficient to engage a portion of the cam 62 to overcome the spring force of the engagement spring 70. The actuator mechanism 76 is a pyrotechnic actuator assembly, in some embodiments, that translates the release pin 74 out of engagement with the cam 62 to allow the cam 62 to be biased by the engagement spring 70 into the engagement condition. Although a pyrotechnic actuator assembly is references above, it is to be understood that alternative actuator assemblies may be employed in some embodiments.

The engagement bracket 50 includes a backing plate 78 disposed between the lower jacket 14 and a second surface 80 of the EA strap 42. The backing plate 78 is positioned proximate the second surface 80, and in contact therewith at all times in some embodiments. The backing plate 78 provides structural support for the EA strap 42 by reacting to the engagement loads of the cam 62 when the engagement spring 70 biases the cam 62 into the engaged condition.

Figure 6:
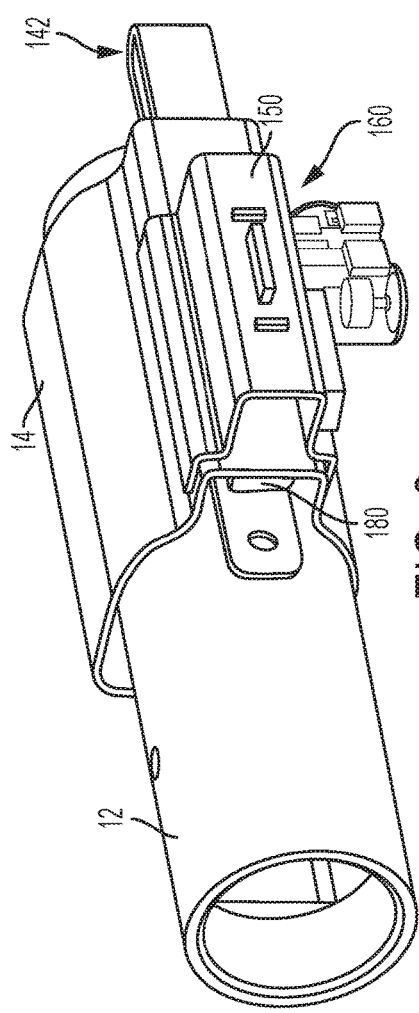
FIG. 6 is a perspective view of a steering column assembly having an energy absorption strap control assembly according to another aspect of the invention.
Figure 8:
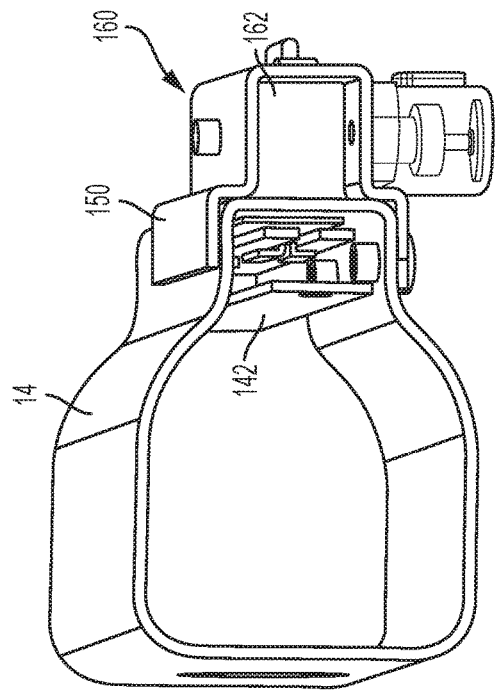
FIG. 8 is a perspective view of the energy absorption strap control assembly of FIG. 6.
Figure 7:
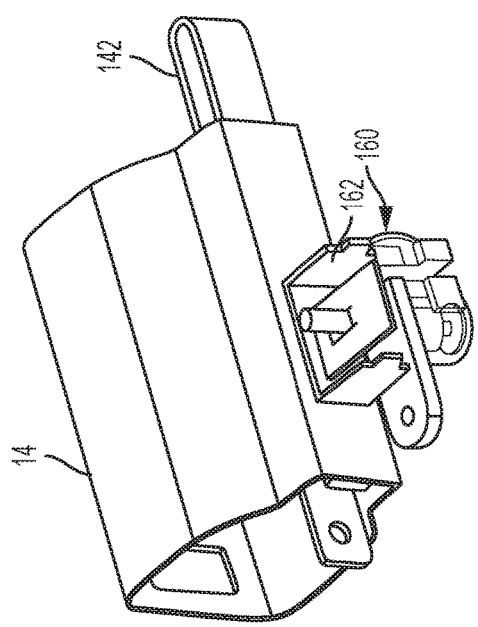
FIG. 7 is a perspective view of the energy absorption strap control assembly of FIG. 6.

Referring now to FIGS. 6-8, another embodiment of the EA strap control assembly is illustrated. The assembly is similar to the embodiments described above and like reference numerals for similar components are employed in some instances. As with the embodiments described above, an EA strap 142 is coupled to the upper and lower jackets 12, 14, but is in the disengaged condition in the default condition and retained in the disengaged condition with an engagement mechanism 160.

The EA strap 142 defines a slot 180 extending in a longitudinal direction of the EA strap 142. The slot 180 allows the EA strap 142 to translate relative to the engagement mechanism 160. An engagement bracket 150 is operatively coupled in any suitable manner to the lower jacket 14.

The EA strap 142 has a plurality of teeth 144 extending along a first surface 146 of the EA strap (FIG. 12). The engagement mechanism 160 includes a locking component 162 operatively coupled to the engagement bracket 150 and extending through a window of the lower jacket 14. The locking component 162 includes a plurality of locking teeth 172 that are positioned to be engaged in a meshed condition with the teeth 144 of the EA strap 142 in the engaged condition and disengaged therefrom in the disengaged condition.

Figure 10:
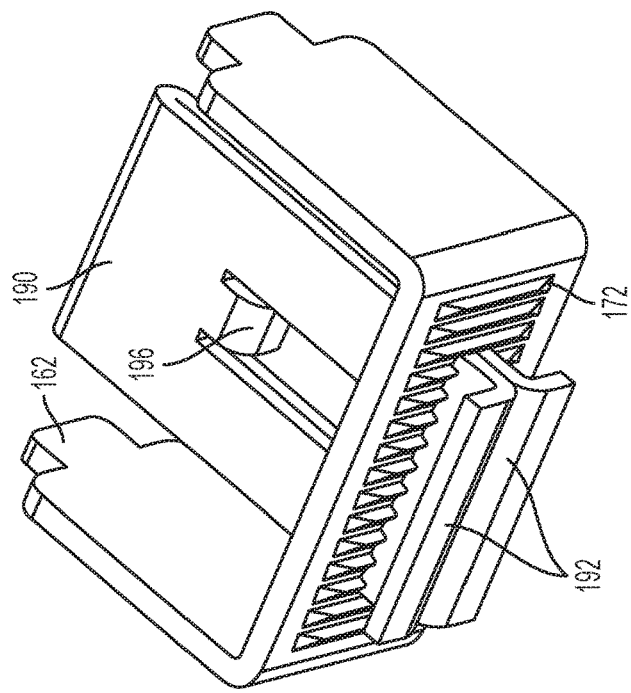
FIG. 10 is a perspective view of the locking component and an engagement strap of the energy absorption strap control assembly of FIG. 6.
Figure 9:
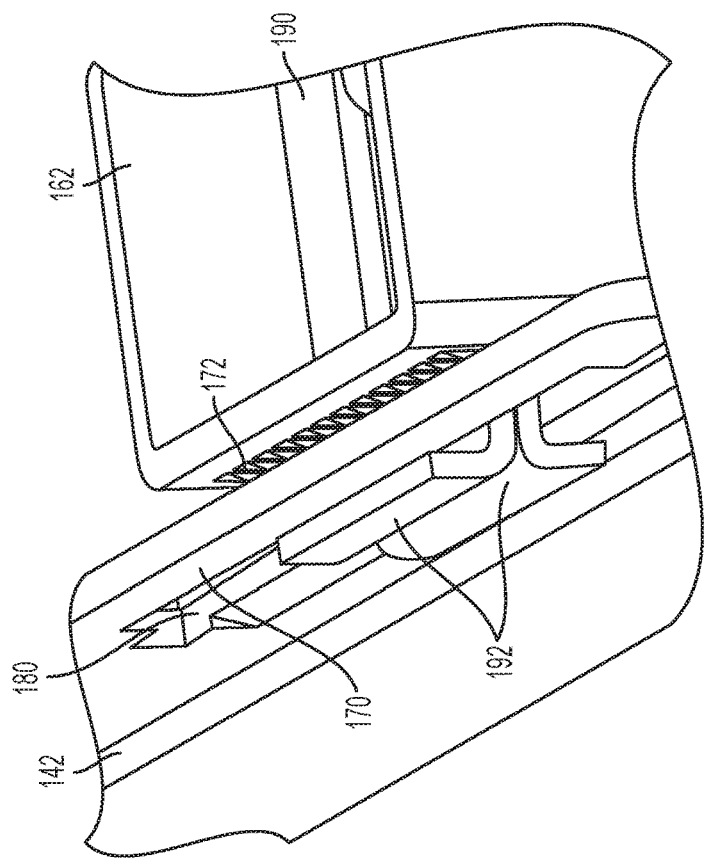
FIG. 9 is a perspective view illustrating engagement of a locking component and an energy absorption strap of the energy absorption strap control assembly of FIG. 6.

Referring now to FIGS. 9 and 10, the structural relationship between the locking component 162, an engagement strap 190 and the EA strap 142 is illustrated in greater detail. The engagement strap 190 extends through an aperture of the locking component 162 and through the slot 180 of the EA strap 142. The engagement strap 190 includes at least one tab 192 that is in contact with a second surface of the 170 of the EA strap 142. In the illustrated embodiment, a pair of tabs 192 is provided. In the disengaged condition, the teeth of the EA strap 142 are not engaged with the locking teeth 172 of the locking component 162.

Referring now to FIGS. 11-13, an actuator mechanism 176 is illustrated. The actuator mechanism 176 includes an actuator rod 194 extending therefrom and into contact with the engagement strap 190. In particular, the actuator rod 194 extends through an aperture of the engagement strap 190 and a ramped surface 198 is in contact with a cam surface 196 (FIG. 10) of the engagement strap 190. Upon actuation of the actuator mechanism 176, the actuator rod 194 is translated to impart movement of the engagement strap 190 through interaction of the ramped surface 198 and the cam surface 196. Movement of the engagement strap 190 pulls the EA strap 142 and the locking component 162 toward each other to establish the engaged condition.

Figure 15:
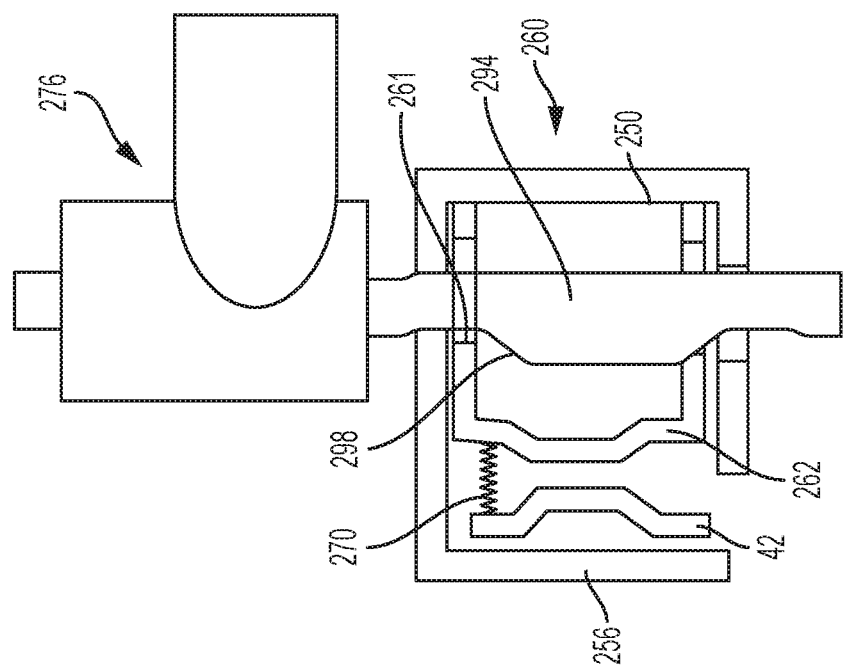
FIG. 15 is an elevational view of the energy absorption strap control assembly of FIG. 14.
Figure 14:
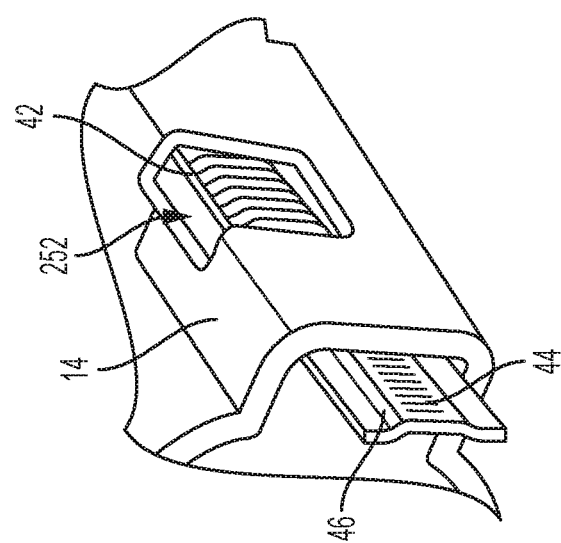
FIG. 14 is a perspective view of a steering column assembly having an energy absorption strap control assembly according to another aspect of the invention.
Figure 16:
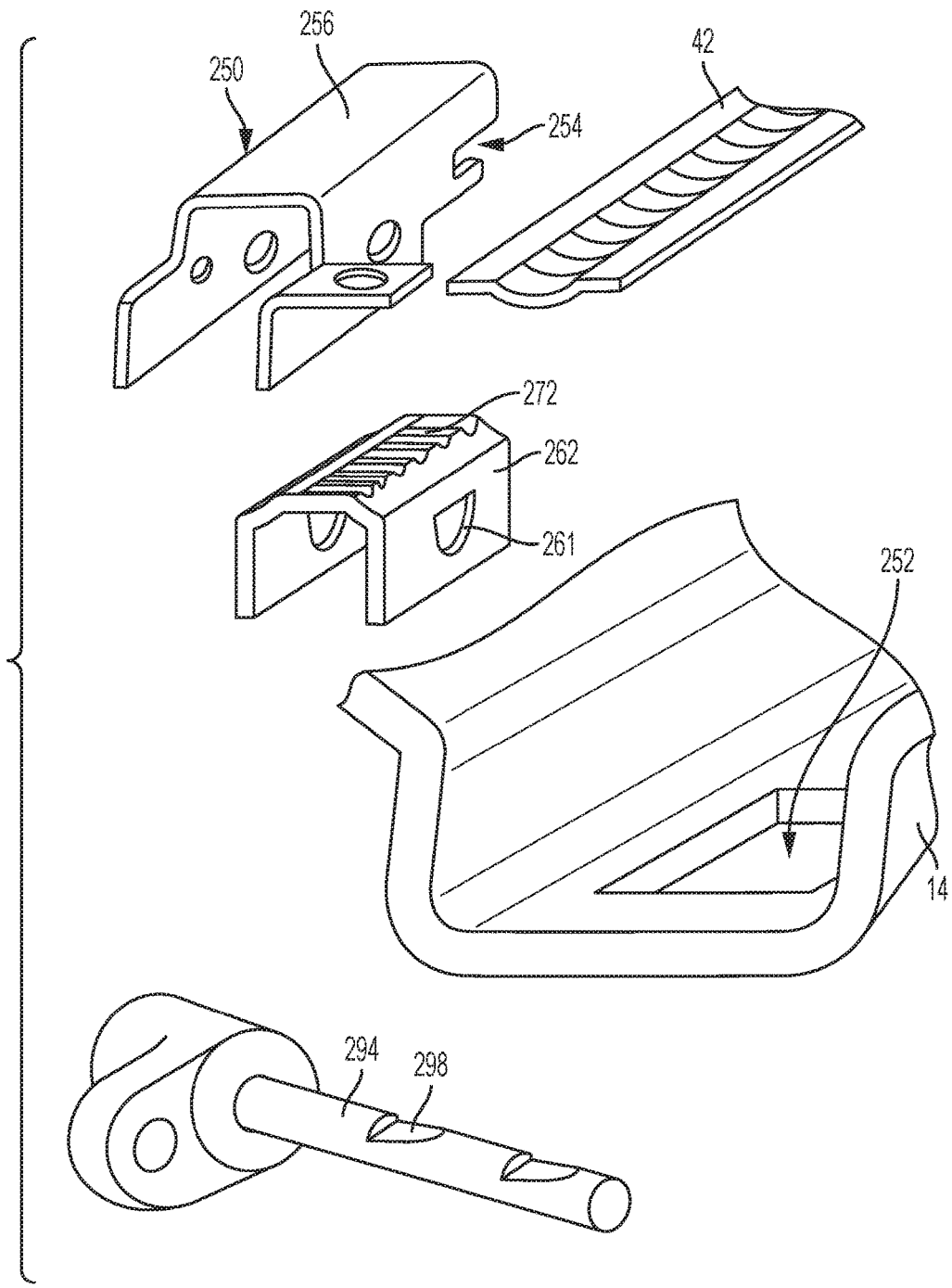
FIG. 16 is a disassembled view of the energy absorption strap control assembly of FIG. 14.

Referring now to FIGS. 14-16, another embodiment of the EA strap control assembly is illustrated. The assembly is similar to the embodiments described above and like reference numerals for similar components are employed in some instances. As with the embodiments described above, an EA strap 42 is coupled to the upper and lower jackets 12, 14, but is in the disengaged condition in the default condition and retained in the disengaged condition with an engagement mechanism 260.

An engagement bracket 250 is operatively coupled in any suitable manner to the lower jacket 14 and partially disposed within a window 252 defined by the lower jacket 14. Coupling of the engagement bracket 250 to the lower jacket 14 is made in any suitable manner. In the illustrated embodiment, the engagement bracket 250 includes a recess 254 defined by a pair of lipped portions, the recess 254 fitted over a portion of the lower jacket 14 that defines the window 252.

The EA strap 42 extends through the engagement bracket 250 between a back wall 256 of the bracket and the window 252.

The plurality of teeth 44 extend along the first surface 46 of the EA strap 42, as described above. The engagement mechanism 260 includes a locking component 262 operatively coupled to the engagement bracket 250 and extending through the window 252 of the lower jacket 14. The locking component 262 includes a plurality of locking teeth 272 that are positioned to be engaged in a meshed condition with the teeth 44 of the EA strap 42 in the engaged condition and disengaged therefrom in the disengaged condition.

An actuator mechanism 276 includes an actuator rod 294 extending therefrom and into contact with the locking component 262. In particular, the actuator rod 294 extends through an aperture of the locking component 262 and a ramped surface 298 is in contact with an aperture wall 261 of the locking component 262. Upon actuation of the actuator mechanism 276, the actuator rod 294 is translated to impart movement of the locking component 262 through interaction of the ramped surface 298 and the aperture wall 261. Movement of the locking component 262 establishes the engaged condition by overcoming the spring force of spring 270 that biases the spring toward the disengaged condition.

Figure 17:
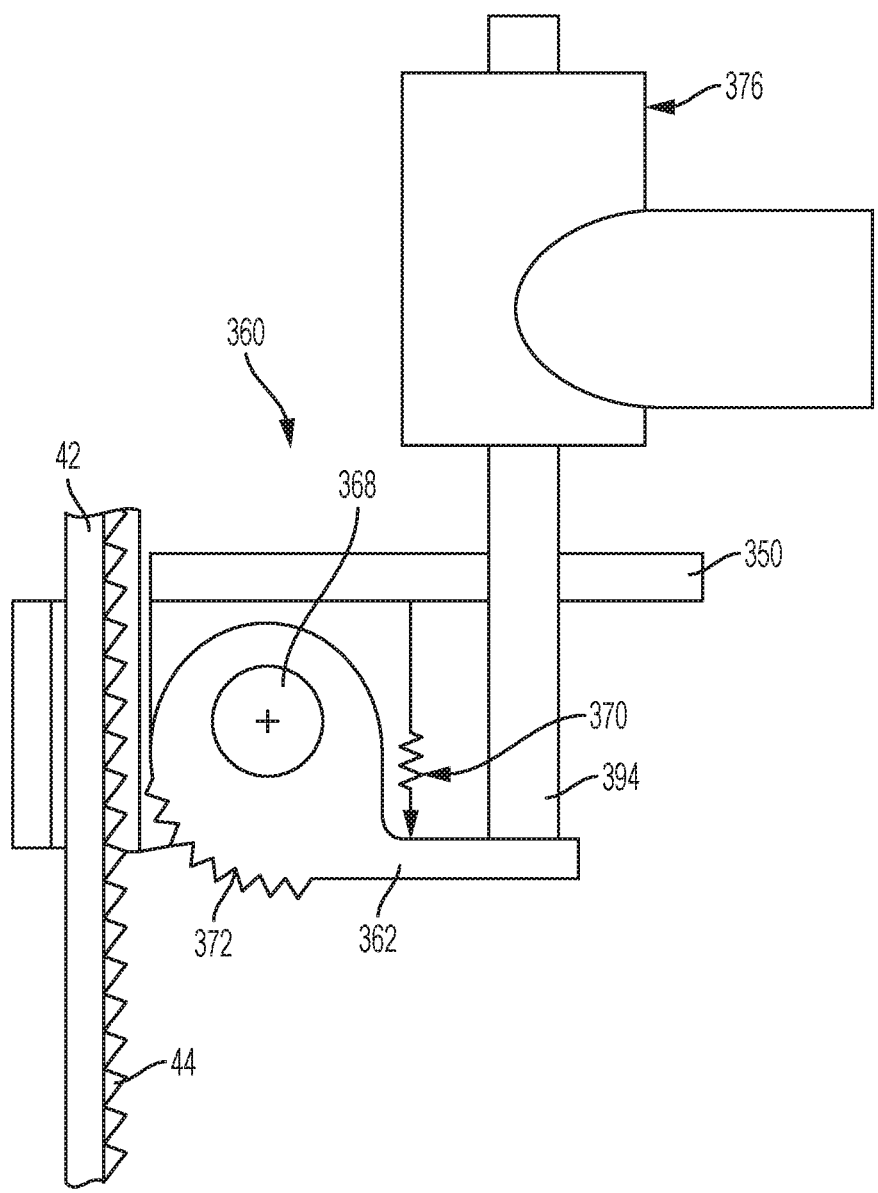
FIG. 17 is an energy absorption strap control assembly according to another aspect of the invention.

Referring now to FIG. 17, another embodiment of the EA strap control assembly is illustrated. The assembly is similar to the embodiments described above and like reference numerals for similar components are employed in some instances. As with the embodiments described above, an EA strap 42 is coupled to the upper and lower jackets 12, 14, but is in the disengaged condition in the default condition and retained in the disengaged condition with an engagement mechanism 360.

In the illustrated embodiment, a cam 362 is rotatable about a pivot pin 368 that couples the cam 362 to an engagement bracket 350, the pivot pin 368 being fixed relative to the engagement bracket 350. The cam 362 includes a plurality of locking teeth 372 that are positioned to be engaged in a meshed condition with the teeth 44 of the EA strap 42 in the engaged condition and disengaged therefrom in the disengaged condition. A disengagement spring 370 extends between the engagement bracket 350 and the cam 362 to bias the cam 362 to the disengaged condition.

An actuator mechanism 376 includes an actuator rod 394 extending therefrom and into contact with the cam 362. Upon actuation of the actuator mechanism 376, the actuator rod 394 is translated to overcome the spring force and rotate the cam 376 to the engaged condition.

Figure 18:
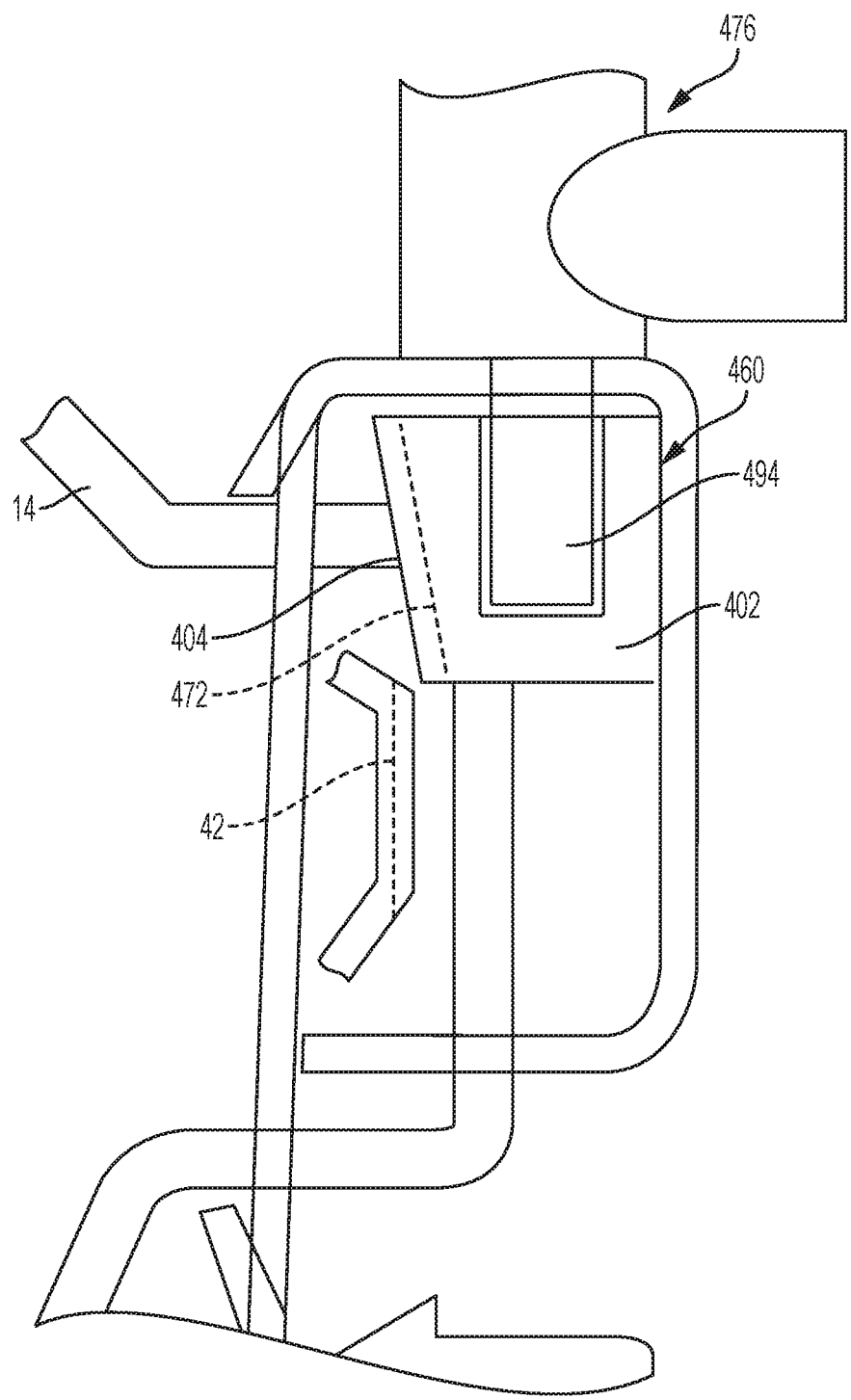
FIG. 18 is an energy absorption strap control assembly according to another aspect of the invention.

Referring now to FIG. 18, another embodiment of the EA strap control assembly is illustrated. The assembly is similar to the embodiments described above and like reference numerals for similar components are employed in some instances. As with the embodiments described above, an EA strap 42 is coupled to the upper and lower jackets 12, 14, but is in the disengaged condition in the default condition and retained in the disengaged condition with an engagement mechanism 460.

A lock shoe 402 having a plurality of locking teeth 472 is maintained in a disengaged condition, relative to the teeth of the EA strap 42, with a disengagement spring. The lock shoe 402 includes a surface with tapered teeth 404. An actuator mechanism 476 includes an actuator rod 494 extending therefrom and into contact with the lock shoe 402. Upon actuation of the actuator mechanism 476, the actuator rod 494 is translated to overcome the spring force and move the lock shoe 402 to engage the teeth of the EA strap in a wedged manner due to the tapered surface 404 of the lock shoe 402.

The embodiments disclosed herein allow the engagement mechanism(s) to be sub-assembled as a module to facilitate integration with existing designs or to be removed with ease. Having a stationary engagement mechanism that does not need to translate during adjustment of the steering column allows the actuator and engagement mechanism to be mounted to the stationary jacket and connected with a minimal length wiring harness, thereby reducing the likelihood of issues that are present with wiring that must shuttle with the assembly. Additionally, the overall assembly is stiffer due to the access slot or window of the lower jacket being reduced in size.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A stationary energy absorption strap control assembly comprising:
    an energy absorption strap operatively coupled to an upper jacket of a steering column assembly and to a lower jacket of the steering column assembly, the energy absorption strap having a plurality of teeth arranged along a first surface of the energy absorption strap;
    an engagement bracket operatively coupled to the lower jacket and partially disposed within a window defined by the lower jacket, the engagement bracket having a backing plate disposed between the lower jacket and a second surface of the energy absorption strap, the engagement bracket remaining in a stationary position relative to the lower jacket during translation of the energy absorption strap; and
    an engagement member coupled to the engagement bracket and having a plurality of locking teeth, the engagement member moveable between an engaged condition and a disengaged condition, the engaged condition disposing the plurality of locking teeth of the engagement member and the plurality of teeth of the energy absorption strap into engagement.

2. The assembly of claim 1, wherein the engagement member comprises a cam rotatable between the engaged condition and the disengaged condition.

3. The assembly of claim 2, further comprising an engagement spring biasing the cam toward the engaged condition.

4. The assembly of claim 3, wherein the disengaged condition is the default condition of the assembly.

5. The assembly of claim 4, further comprising an actuator mechanism having a release pin extending therefrom into engagement with the cam to retain the cam in the disengaged condition.

6. The assembly of claim 4, wherein the engagement spring and the cam are fixed to, and rotatable about, a pivot pin operatively coupled to the engagement bracket.

7. The assembly of claim 1, wherein the engagement bracket comprises at least one locating feature engageable with a lower jacket locating feature for aligning the engagement bracket with the window of the lower jacket.

8. The assembly of claim 1, wherein the lower jacket comprises at least one flange integrally formed therewith, the engagement bracket coupled to the at least one flange.

9. A steering column assembly comprising:
    an upper jacket;
    a lower jacket, the upper jacket translatable relative to the lower jacket;
    an energy absorption strap operatively coupled to the upper jacket and the lower jacket, the strap translatable with the upper jacket; and
    an engagement mechanism operatively coupled to the lower jacket, the engagement mechanism moveable between an engaged condition with the energy absorption strap and a disengaged condition with the energy absorption strap, the engaged condition increasing the energy absorption load of the steering column assembly during collapse of the upper jacket into the lower jacket, the engagement mechanism remaining in a stationary position relative to the lower jacket during translation of the energy absorption strap, the engagement mechanism comprising:
    an engagement bracket operatively coupled to the lower jacket and partially disposed within a window defined by the lower jacket;
    a pivot pin operatively coupled to the engagement bracket;
    a cam having a plurality of locking teeth engaged with a plurality of teeth of the energy absorption strap in the engaged condition and disengaged with the plurality of teeth of the energy absorption strap in the disengaged condition, the cam fixed about, and rotatable about, the pivot pin;
    an engagement spring biasing the cam toward the engaged condition; and
    an actuator mechanism having a release pin extending therefrom into engagement with the cam to retain the cam in the disengaged condition, the disengaged condition being the default condition of the engagement mechanism.

10. A steering column assembly comprising:
    an upper jacket;
    a lower jacket, the upper jacket translatable relative to the lower jacket;
    an energy absorption strap operatively coupled to the upper jacket and the lower jacket, the strap translatable with the upper jacket; and
    an engagement mechanism operatively coupled to the lower jacket, the engagement mechanism moveable between an engaged condition with the energy absorption strap and a disengaged condition with the energy absorption strap, the engaged condition increasing the energy absorption load of the steering column assembly during collapse of the upper jacket into the lower jacket, the engagement mechanism remaining in a stationary position relative to the lower jacket during translation of the energy absorption strap, the energy absorption strap defining a slot extending in a longitudinal direction of the strap, the engagement mechanism comprising:
    an engagement bracket operatively coupled to the lower jacket;
    a locking component operatively coupled to the engagement bracket, the locking component having a plurality of locking teeth engaged with a plurality of teeth of the energy absorption strap disposed on a first surface of the energy absorption strap in the engaged condition and disengaged with the plurality of teeth of the energy absorption strap in the disengaged condition;

an engagement strap extending through an aperture defined by the locking component and through the slot of the energy absorption strap to be in contact with a second surface of the engagement strap; and an actuator mechanism having an actuator rod with a ramped surface in contact with the engagement strap, movement of the actuator rod biasing the engagement strap to apply a force on the second surface of the energy absorption strap to move the mechanism into the engaged condition.

11. A steering column assembly comprising:

an upper jacket;

a lower jacket, the upper jacket translatable relative to the lower jacket;

an energy absorption strap operatively coupled to the upper jacket and the lower jacket, the strap translatable with the upper jacket; and an engagement mechanism operatively coupled to the lower jacket, the engagement mechanism moveable between an engaged condition with the energy absorption strap and a disengaged condition with the energy absorption strap, the engaged condition increasing the energy absorption load of the steering column assembly during collapse of the upper jacket into the lower jacket, the engagement mechanism remaining in a stationary position relative to the lower jacket during translation of the energy absorption strap, the engagement mechanism comprising:

an engagement bracket operatively coupled to the lower jacket and partially disposed within a window defined by the lower jacket;

a locking component operatively coupled to the engagement bracket, the locking component having a plurality of locking teeth engaged with a plurality of teeth of the energy absorption strap in the engaged condition and disengaged from the plurality of locking teeth of the energy absorption strap in the disengaged condition;

a spring biasing the locking component toward the disengaged condition; and an actuator mechanism having an actuator rod with a ramped surface in contact with the locking component, movement of the actuator rod biasing the locking component to apply a force to overcome the spring force to move the mechanism into the engaged condition.

12. A steering column assembly comprising:

an upper jacket;

a lower jacket, the upper jacket translatable relative to the lower jacket;

an energy absorption strap operatively coupled to the upper jacket and the lower jacket, the strap translatable with the upper jacket; and an engagement mechanism operatively coupled to the lower jacket, the engagement mechanism moveable between an engaged condition with the energy absorption strap and a disengaged condition with the energy absorption strap, the engaged condition increasing the energy absorption load of the steering column assembly during collapse of the upper jacket into the lower jacket, the engagement mechanism remaining in a stationary position relative to the lower jacket during translation of the energy absorption strap, the energy absorption strap including a plurality of teeth disposed along a first surface of the energy absorption strap, the engagement mechanism comprising:

an engagement bracket operatively coupled to the lower jacket and having a backing plate disposed between the lower jacket and a second surface of the energy absorption strap;

a cam having a plurality of locking teeth engaged with the plurality of teeth of the energy absorption strap in the engaged condition and disengaged with the plurality of teeth of the energy absorption strap in the disengaged condition, the cam fixed about, and rotatable about, the pivot pin;

a spring biasing the locking component toward the disengaged condition; and an actuator mechanism having an actuator rod with a ramped surface in contact with the cam, movement of the actuator rod biasing the cam to apply a force to overcome the spring force to move the mechanism into the engaged condition.

13. A stationary energy absorption strap control assembly comprising:

an energy absorption strap operatively coupled to an upper jacket of a steering column assembly and to a lower jacket of the steering column assembly, the energy absorption strap translatable with the upper jacket and having a plurality of teeth arranged along a first surface of the energy absorption strap;

an engagement bracket operatively coupled to the lower jacket to remain in a stationary position relative to the lower jacket during translation of the energy absorption strap;

a locking component operatively coupled to the engagement bracket and having a plurality of locking teeth, the locking component moveable between an engaged condition and a disengaged condition, the engaged condition disposing the plurality of locking teeth of the locking component and the plurality of teeth of the energy absorption strap into engagement; and an actuator rod operatively coupled to the engagement bracket and engageable with the locking component to move the locking component between the engaged condition and the disengaged condition, the energy absorption strap defining a slot extending in a longitudinal direction of the strap, an engagement strap extending through an aperture defined by the locking component and through the slot of the energy absorption strap to be in contact with a second surface of the engagement strap; and a ramped surface of the actuator rod in contact with the engagement strap, movement of the actuator rod biasing the engagement strap to apply a force on the second surface of the energy absorption strap to move the locking component into the engaged condition.

14. The stationary energy absorption strap control assembly of claim 13, the locking component comprising a lock shoe defining a bore for receiving the actuator rod therein, the lock shoe having plurality of tapered lock teeth disposed thereon, the lock shoe rotatably biased about the actuator rod during engagement with the plurality of teeth of the energy absorption strap.

15. A stationary energy absorption strap control assembly comprising:

an energy absorption strap operatively coupled to an upper jacket of a steering column assembly and to a lower jacket of the steering column assembly, the energy absorption strap translatable with the upper jacket and having a plurality of teeth arranged along a first surface of the energy absorption strap;

an engagement bracket operatively coupled to the lower jacket to remain in a stationary position relative to the lower jacket during translation of the energy absorption strap;

a locking component operatively coupled to the engagement bracket and having a plurality of locking teeth, the locking component moveable between an engaged condition and a disengaged condition, the engaged condition disposing the plurality of locking teeth of the locking component and the plurality of teeth of the energy absorption strap into engagement; and an actuator rod operatively coupled to the engagement bracket and engageable with the locking component to move the locking component between the engaged condition and the disengaged condition, further comprising:

a spring biasing the locking component toward the disengaged condition; and a ramped surface of the actuator rod in contact with the locking component, movement of the actuator rod biasing the locking component to apply a force to overcome the spring force to move the locking component into the engaged condition.

16. The stationary energy absorption strap control assembly of claim 15, the locking component comprising a lock shoe defining a bore for receiving the actuator rod therein, the lock shoe having plurality of tapered lock teeth disposed thereon, the lock shoe rotatably biased about the actuator rod during engagement with the plurality of teeth of the energy absorption strap.

17. A stationary energy absorption strap control assembly comprising:

an energy absorption strap operatively coupled to an upper jacket of a steering column assembly and to a lower jacket of the steering column assembly, the energy absorption strap translatable with the upper jacket and having a plurality of teeth arranged along a first surface of the energy absorption strap;

an engagement bracket operatively coupled to the lower jacket to remain in a stationary position relative to the lower jacket during translation of the energy absorption strap;

a locking component operatively coupled to the engagement bracket and having a plurality of locking teeth, the locking component moveable between an engaged condition and a disengaged condition, the engaged condition disposing the plurality of locking teeth of the locking component and the plurality of teeth of the energy absorption strap into engagement; and an actuator rod operatively coupled to the engagement bracket and engageable with the locking component to move the locking component between the engaged condition and the disengaged condition, the engagement bracket having a backing plate disposed between the lower jacket and a second surface of the energy absorption strap, the locking component being a cam fixed about, and rotatable about, a pivot pin, the assembly further comprising:

a spring biasing the cam rotatably toward the disengaged condition; and a ramped surface of the actuator rod in contact with the cam, translation of the actuator rod biasing the cam to apply a force to overcome the spring force to move the locking component into the engaged condition.

18. The stationary energy absorption strap control assembly of claim 17, the locking component comprising a lock shoe defining a bore for receiving the actuator rod therein, the lock shoe having plurality of tapered lock teeth disposed thereon, the lock shoe rotatably biased about the actuator rod during engagement with the plurality of teeth of the energy absorption strap.

\* \* \* \* \*